United States Patent [19]
Lemkin et al.

[11] Patent Number: 4,574,477
[45] Date of Patent: Mar. 11, 1986

[54] HOLE CUTTER FOR PLASTIC TUBING

[75] Inventors: Jack L. Lemkin, Cincinnati; Eugene A. Zilber; Carl A. Peterson, both of Columbus, all of Ohio

[73] Assignee: The O. M. Scott & Sons Company, Marysville, Ohio

[21] Appl. No.: 638,059

[22] Filed: Aug. 6, 1984

[51] Int. Cl.[4] .......................... B23D 21/10; B26F 1/36
[52] U.S. Cl. .......................................... 30/92; 30/124; 408/105
[58] Field of Search .................. 30/92, 93, 94, 95, 96, 30/124; 408/104, 105

[56] References Cited

U.S. PATENT DOCUMENTS 2,416,228 2/1947 Sheppard ........................... 408/105
2,642,651 6/1953 Palley .............................. 30/124 X
2,796,657 6/1957 Schlueter .......................... 30/124 X
2,814,092 11/1957 Laviano ............................... 30/124
3,120,143 2/1964 Kreider .................................. 30/92
3,646,954 3/1972 Hutton ............................... 408/105

*Primary Examiner*—Jimmy C. Peters
*Attorney, Agent, or Firm*—James B. Raden; Harold J. Holt

[57] ABSTRACT

A hole cutter for plastic tubing comprising a pair of opposed members pivotally joined at one end thereof, means between said opposed members for limiting their separation in open position, recesses within the opposed members for gripping a tube and a hollow cylindrical blade rotatably mounted on one of the opposed members, adapted upon rotation to cut a hole in a tube gripped in the cutter.

4 Claims, 6 Drawing Figures

HOLE CUTTER FOR PLASTIC TUBING

This invention relates to a hole cutter for plastic tubing, particularly tubing of the type used in the irrigation of home gardens and plants.

Home garden or foundation watering systems are becoming increasingly more popular as an economical and convenient means of irrigating garden, ornamental and foundation plants. These systems normally include small sprinklers, drippers, feed and connecting tubing and connectors all adapted to be assembled by the home gardner in accordance with his or her specific garden or landscaping requirements. In these systems, the feed hose or tubing must be perforated at certain locations for the attachment of smaller diameter tubing which connects with the various sprinklers and emitters. While a number of cutters of various designs are known, none combine the attributes of a simple, inexpensive cutter with one which functions effectively to produce clean, accurately positioned holes.

The present invention provides a hole cutter which is at once simple in design, inexpensive to produce and yet is capable of cutting holes in plastic tubing simply and effectively. The hole cutter of the invention comprises a pair of opposed members pivotally joined at one end and facing each other at the opposite free ends, the opposed members being pivotally adjustable to an open and closed position, means between the opposed members limiting the separation between the free ends in the open position, the free ends of the opposed members having complimentary shaped recesses adapted in closed position to form a tube-shaped opening for gripping a tube therebetween, and a hollow cylindrical cutting blade rotatably mounted on the free end of one of the opposed members, the cutting edge of the blade extending into the tube-shaped opening, the blade adapted upon rotation to cut a hole in a tube gripped in the cutter.

The invention will be better understood by reference to the accompanying drawing in which.

Figure 1:
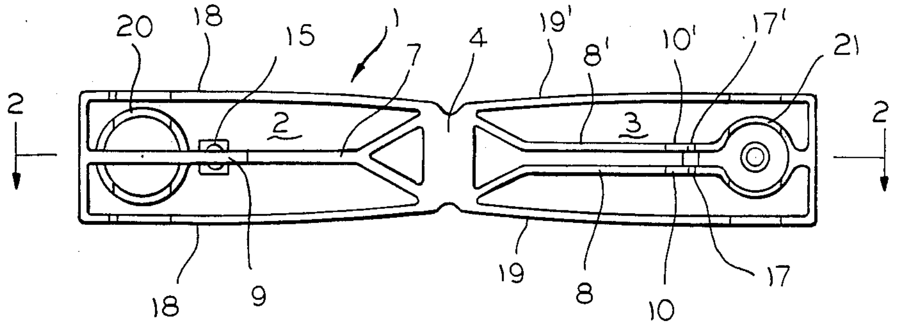
FIG. 1 is an elevational view of a cutter body in accordance with the invention showing it in fully unfolded position and without the cutting blade therein.
Figure 2:
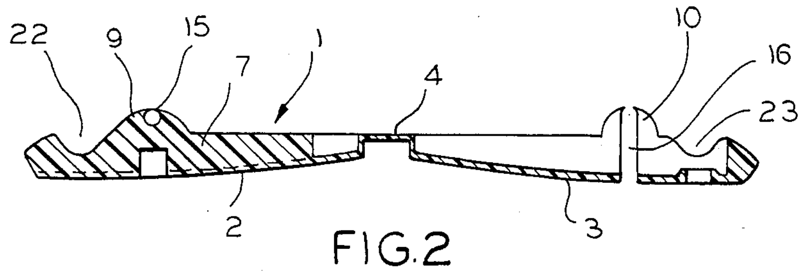
FIG. 2 is a crossectional view of the cutter body along the lines 2—2 of FIG. 1.
Figure 3:
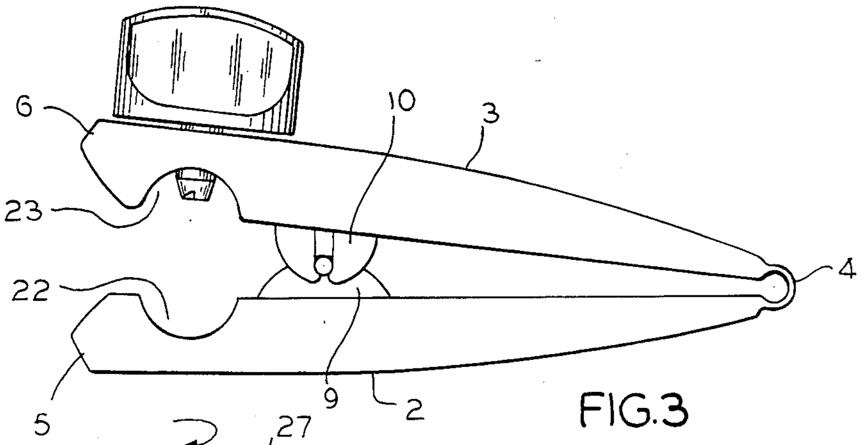
FIG. 3 is an elevational view of the cutter body of FIG. 1 with the cutting blade in place therein and folded into operating, open position.
Figure 5:
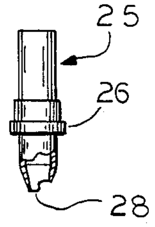
FIG. 5 is an elevational view, partially in crossection, of the cutting blade.
Figure 6:
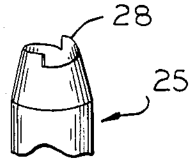
FIG. 6 is an enlarged view of the end of the cutting blade to show the cutting edge thereof.
Figure 4:
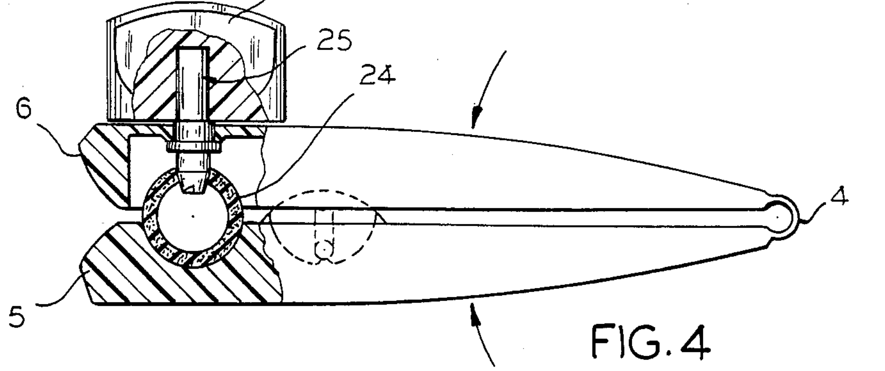
FIG. 4 is a view similar to FIG. 3 but partially in crossection and with the cutter in closed position.

The cutter tool comprises a cutter body 1 conveniently made of a plastic such as polyethylene or polypropylene. Cutter body is made up of the opposed members 2 and 3 pivotally joined at the end thereof by a pivot joint 4. As shown in FIGS. 3 and 4, members 2 and 3 face each other at their opposite free ends 5 and 6 when cutter body 1 is in folded or operating position. The cutter body contains a reinforcing rib 7 on the underside of member 2 and a pair of reinforcing ribs 8 and 8' on the underside of member 3, said ribs running essentially the entire length of the opposed members. Member 2 contains a projection 9 from rib 7 and member 3 contains a pair of spaced projections 10 and 10' from ribs 8 and 8'. A pin-shaped protuberance 15 extends transversely from both sides of projection 9. The spaced projections 10 and 10' each have a slot 16 restricted in width at their outer extremity 17 and 17'. The projection 9 fits between projections 10 and 10' when the cutter body is folded into operating position with the protuberance 15 extending into and slideable within the aligned slots 16. Because of the restriction 17 and 17' at the outer end of the slots, the opposing members of the cutter may be adjusted from open to closed position but they are restrained from separation beyond the open position (FIG. 3).

A wall 18 and 18' and a corresponding wall 19 and 19' runs along the peripheral sides of members 2 and 3. In addition, opposed members 2 and 3 have circular walls 20 and 21 which face each other at the center of the free ends of the opposed members when the cutter body is folded into operating position. The height of ribs 7, 8 and 8' and of walls 18, 18', 19, 19', 20 and 21 are all approximately the same. This type of structure combines maximum strength of the cutter body with least usage of plastic material and lighest weight. The free ends of the opposed members 2 and 3 have complimentary shaped recesses 22 and 23 therein which extend into the peripheral walls 18, 18' and 19, 19' as well as into circular walls 20 and 21 and reinforcing rib 7 in member 2. In closed position, these recesses form a tube-shaped opening for gripping a tube 24 (FIG. 4) for the purpose of cutting a hole therein.

A cutting blade 25 is rotatably mounted on the free end of opposed member 2, the cuting edge of the blade extending into the tube-shaped opening. The blade contains a flange 26 for holding the blade within the recess of the member 2. The blade is anchored on the outside of the member 2 in a handle 27 which is used for rotation of the blade during a cutting operation. The cutting edge 28 of blade 25 is in the shape of two helical segments, one slightly stepped up from the other.

In operation, with the cutter in open position, a plastic tube is laid across the opening formed by recesses 22 and 23 with the portion of tube which is to be perforated facing the blade 25. The opposed members of the cutter are then brought into closed position and the tube punctured by the blade. The blade is then rotated by handle 27 and the now perforated tube removed from the cutter.

The cutter, by virtue of its design, is light in weight and simple in construction. The cutter body may be manufactured as a single plastic unit, requiring only the addition of a cutting blade and handle to complete the cutter tool. In operation, it perforates a plastic pipe simply, accurately and with complete safety to the operator.

What is claimed is:

1. A hole cutter for plastic tubing comprising:

a pair of opposed members pivotally joined at one end thereof by an integral pivot and facing each other at the opposite free ends thereof, said opposed members being pivotally adjustable to an open and closed position, means between said opposed members limiting the separation between the free ends thereof in the open position, said limiting means being spaced between said integral pivot and said free ends and comprising aligned projections extending toward each other from each of said opposed members, said limiting means permitting adjustment of said opposed members between open and closed position but restricting separation beyond said open position, the free ends of said opposed members having complimentary shaped recesses therein at the extremity of the free ends thereof adapted in closed position to form a tube-shaped opening for gripping a tube therebetween, and a hollow cylindrical cutting blade rotatably mounted on the free end of one of said opposed members, the cutting edge of said blade extending through said free end into the tube-shaped opening, said blade adapted upon rotation to cut a hole in tube gripped in said cutter.

2. The hole cutter of claim 1 in which the cutting edge of said hollow cylindrical cutting blade is in the shape of two helical segments.

3. The hole cutter of claim 1 in which said limiting means comprises a single projection extending from one of said opposed members and a pair of spaced projections extending from the other of said members, said single projection have transversely extending protuberances thereon, said pair of spaced projections having aligned slots therein restricted in width at their outer extremity, said single projection fitting between said spaced projections with said transverse protuberances extending into and slideable within said aligned slots, said limiting means permitting adjustment of said opposed members between open and closed position but restricting separation beyond said open position.

4. The hole cutter of claim 1 in which said cutting blade contains a handle thereon mounted on the outside of the free end of said one of said opposed members for rotation of said blade to cut a hole in a tube gripped in said cutter.

* * * * *